United States Patent [19]

Chalkley et al.

[11] Patent Number: 5,711,929

[45] Date of Patent: *Jan. 27, 1998

[54] PURIFICATION OF ELEMENTAL SULPHUR

[75] Inventors: Michael E. Chalkley, St. Albert; Michael J. Collins, Fort Saskatchewan; Manher M. Makwana, Edmonton; Ian M. Masters, Fort Saskatchewan; John Stiksma, St. Albert, all of Canada

[73] Assignee: 698638 Alberta Ltd., Alberta, Canada

[*] Notice: The term of this patent shall not extend beyond the expiration date of Pat. No. 5,403,571.

[21] Appl. No.: 416,013

[22] Filed: Apr. 3, 1995

Related U.S. Application Data

[63] Continuation-in-part of Ser. No. 700,149, filed as PCT/CA90/00187, Jun. 5, 1990, Pat. No. 5,403,571.

[30] Foreign Application Priority Data

May 6, 1989 [GB] United Kingdom .................. 8912861

[51] Int. Cl.$^6$ .................................................. C01B 17/02
[52] U.S. Cl. ................ 423/567.1; 423/99; 423/578.1
[58] Field of Search ...................... 423/99, 106, 110, 423/567.1, 576.5, 576.6, 578.1

[56] References Cited

U.S. PATENT DOCUMENTS

| | | | |
|---|---|---|---|
| 3,213,006 | 10/1965 | Crain et al. | 204/99 |
| 3,954,451 | 5/1976 | Kinoshita | 75/108 |
| 5,403,571 | 4/1995 | Chalkley et al. | 423/567.1 |

FOREIGN PATENT DOCUMENTS

| | | | |
|---|---|---|---|
| 56725 | 11/1986 | Australia . | |
| 5018466 | 6/1975 | Japan | 423/99 |
| 5261196 | 5/1977 | Japan | 423/566.1 |
| 5589436 | 7/1980 | Japan | 423/99 |
| 9015021 | 12/1990 | WIPO | 423/567 R |

*Primary Examiner*—Gary P. Straub
*Assistant Examiner*—Timothy C. Vanoy
*Attorney, Agent, or Firm*—Watson Cole Stevens Davis, P.L.L.C.

[57] ABSTRACT

A process for removing mercury from elemental sulphur contaminated therewith by liquid-liquid contact by mixing of the contaminated elemental sulphur in a molten state with an aqueous solution containing sulphide and polysulphide anions for extraction of the mercury contaminant from the elemental sulphur into the aqueous sulphide solution, and separating the aqueous sulphide solution containing mercury contaminant from the molten elemental sulphur to provide an elemental sulphur product substantially free from mercury.

8 Claims, 2 Drawing Sheets

SOLUBILITY OF MERCURIC SULPHIDE IN SODIUM SULPHIDE AND POLYSULPHIDE SOLUTION

FIG. 1 SOLUBILITY OF MERCURIC SULPHIDE IN SODIUM SULPHIDE AND POLYSULPHIDE SOLUTION

PURIFICATION OF ELEMENTAL SULPHUR

This application is a continuation-in-part of application Ser. No. 07/700,149, filed as PCT/CA90/00187, Jun. 5, 1990, which has issued as U.S. Pat. No. 5,403,571.

This invention relates to the removal of mercury from elemental sulphur contaminated with mercury.

BACKGROUND OF THE INVENTION

Sulphuric acid is frequently used in food processing, animal feed production and fertilizer manufacture, and it is clearly necessary that sulphuric acid used for this purpose should not contain undesirably high levels of toxic elements such as mercury. Elemental sulphur is commonly used in the manufacture of sulphuric acid on a commercial scale, and thus it is necessary that such elemental sulphur should be relatively free from such contamination. For example, if sulphuric acid is to contain less than 1 gram/tonne (g/t) mercury, which is a requirement now specified for the purposes mentioned above, then elemental sulphur utilized in the production of sulphuric acid must contain less than 3 g/t mercury. Commercially produced elemental sulphur of volcanic origin, or resulting as a byproduct of metallurgical operations, for example, zinc pressure leaching, has been found to contain up to about 50 g/t mercury. It is therefore necessary to reduce the mercury content in such elemental sulphur before it can be used in the production of sulphuric acid which is substantially mercury free.

Tests have shown that when mercuric sulphide is contacted with molten elemental sulphur, at temperatures of 120° to 150° C., mercury dissolves in the molten sulphur to a level of 30 to 40 g/t. Additional mercuric sulphide particles are "wetted" by the molten sulphur and occluded as solid particles in the molten sulphur phase. Consequently, any process which seeks to achieve a clean separation of mercury from sulphur must be capable of removing the mercury which is dissolved in the molten sulphur, as well as solid particles of mercuric sulphide. It is well known to separate solid metal sulphide particles from molten sulphur by pressure filtration. It is also known to separate solid mercuric sulphide particles from molten sulphur by contacting the melt, at temperatures of 120° to 150° C., with an aqueous solution of an inorganic dispersing agent, thereby transferring the mercuric sulphide particles from the molten sulphur phase to the aqueous phase. The solid mercuric sulphide particles can then be separated from the aqueous solution by filtration at ambient temperatures, which is simpler, cleaner, and less costly than filtering all the molten sulphur. Such a process is described in Japanese Patent, Kokai No. 52(1977) -61, 196 (Yamamoto and Kamio) which teaches a process for separating mercuric sulphide from elemental sulphur, in residues typically contacting about 2% mercury, with the balance being elemental sulphur. The mercuric sulphide is recovered as an upgraded residue containing 10 to 26% Hg, with most of the balance being elemental sulphur. The elemental sulphur byproduct contains 37 to 220 g/t of mercury, and is suitable for reuse in an associated process in which sodium polysulphide is used to precipitate mercury from contaminated sulphuric acid, as a residue containing about 2% Hg, with the balance being elemental sulphur. It will be appreciated that this prior art process does not separate dissolved mercury from elemental sulphur, since it does not reduce the mercury content of sulphur below about 30 g/t.

It was also previously known that mercuric sulphide is soluble in sodium sulphide solutions and in sodium hydrosulphide solution, especially at high pH, see U.S. Pat. No. 3,213,006 (Crain et al) issued Oct. 19, 1965, and two Papers by Efremova et al, namely Efremova, E. P.; Kuznetsov, V. A.; and Shubnikov, A. V.; "Solubility and Crystallization of Cinnabar under Hydrothermal Conditions", Proc. Int. Symp. Hydrotherm. React., 1982, 317–331 and Efremova, E. P.; Kuznetsov, V. A.; and Shikina, N. D.; "Solubility of Cinnabar (Alpha-HgS) in Hydrosulphide Solutions at High Temperature", Geokhimiya, 1982, 1, 56–63. However, the Crain et al patent is merely concerned with an electrolytic cell process with provision for mercury recovery, and the Efremova et al Papers are merely reports of academic research with respect to "Solubility and Crystallization of Cinnabar under Hydrothermal Conditions" and "Solubility of Cinnabar (Alpha-HgS) in Hydrosulphide Solutions at High Temperature".

It is a principal object of the present invention to produce a purified element sulphur product meeting market specifications for use in the manufacture of sulphuric acid for use in food processing, animal feed production and fertilizer manufacture. To meet this requirement, the sulphur must contain less than 3 g/t of mercury. Commercially produced elemental sulphur of volcanic origin, or the byproduct of hydrometallurgical processes, for example, zinc pressure leaching, typically contains up to about 50 g/t mercury, most of which is present in solid solution in the sulphur. It will be appreciated that neither the prior art process of pressure filtration of the molten sulphur, nor the dispersion process of Japanese Patent Kokai No. 52(1977)-61,196, is effective for achieving the degree of mercury removal required to produce sulphur containing less than 3 g/t mercury.

SUMMARY OF THE INVENTION

We have found surprisingly that dissolved mercury can be extracted from molten sulphur by liquid-liquid contact with an aqueous solution containing reduced sulphur anions such as sulphides or polysulphides. Under selected conditions the mercury is transferred directly from the molten sulphur phase into solution in the aqueous phase, where it remains dissolved. The two phases are then separated physically by decantation. The molten sulphur phase which is physically depleted in mercury to less than 3 g/t, is solidified by cooling, and may be marketed without further treatment. The aqueous solution, containing up to 150 mg/L of dissolved mercury, is treated by acidification to precipitate solid mercuric sulphide which may be separated by filtration. This precipitate, which typically contains 0.5% Hg with the balance being elemental sulphur, could potentially be treated by hot pressure filtration, or by the method of Japanese Patent Kokai No. 52(1977)-61,196, to recover most of the contained elemental sulphur.

The mercury extraction process is carried out by contacting the two immiscible liquid phases, the molten sulphur phase, and the aqueous sulphide solution phase, in a well agitated pressure vessel at 120° to 155° C. for up to 10 minutes. The agitation is then stopped to allow the two phases to separate under gravity, and the phases are separated by decantation.

The control of the composition of the aqueous sulphide solution is critical. We have found that, for optimum extraction of mercury, the aqueous solution should contain 20 to 50 g/L of dissolved sulphide plus polysulphide ions, and should have a pH value in the range 9.0 to 10.0. A further requirement is that the terminal mass ratio of sulphide plus polysulphide ions to mercury in the extracting solution should be at least about 300:1. It is also essential that the target concentration of mercury in the aqueous sulphide solution should not exceed the solubility of mercury in the extracting solution (which is dependent on the sulphide concentration). This requirement will largely determine the optimum volume ratio of the aqueous solution phase to the molten sulphur phase in the contacting step in the range of about 2:1 to about 1:5 within which the volume ratio is adjusted to control the terminal concentration of dissolved mercury in the aqueous solution within the solubility limit of mercury in the aqueous solution. Typically, a 1:1 volume ratio would be suitable for the extraction of mercury from contaminated sulphur containing 50 to 60 g/t Hg. For contaminated sulphur with less than 20 g/t Hg, a sulphur to aqueous phase volume ratio of up to 5:1 can be used. As in conventional solvent extraction processes, a multiple stage countercurrent system can be used for enhanced performance.

The extracting solution may be prepared by dissolving crystalline sodium sulphide in water and adding sodium hydroxide as necessary to maintain the solubility solution pH in the range 9.0 to 10.0. It should be noted that the sodium hydroxide, added to raise the pH, reacts with elemental sulphur to form sulphides, polysulphides and thiosulphate, so that there is typically a drop in pH value during the period of liquid-liquid contact. This may be corrected by staged additions of sodium hydroxide during the extraction. Alternatively, and preferably, the extracting solution may be prepared in situ, by adding a suitable solution of sodium hydroxide directly to the contacting vessel containing the contaminated sulphur, where the required sulphide and polysulphide are formed by reaction between sodium hydroxide and molten elemental sulphur. Optimum solution compositions, for the extraction of dissolved mercury from contaminated sulphur, are achieved when the molar ratio of sulphide sulphur (or equivalent of sodium hydroxide) in the aqueous feed solution, to mercury in the contaminated sulphur, is at least about 400:1. When sodium hydroxide is used, one mole of NaOH is assumed to produce one third of a mole of soluble sulphide, according to the equation:

$$6NaOH+2S \rightarrow 2Na_2S+Na_2S_2O_3+3H_2O$$

The effective solution pH range is determined by the solubility properties of mercury in the sulphide solution, and the need to limit the rate of reaction between sodium hydroxide and elemental sulphur. The solubility of mercuric sulphide in sodium sulphide and polysulphide solutions is very dependent on pH at temperatures up to 85° C. (FIG. 1). Mercury is essentially insoluble, i.e. less than 1 mg/L, in sulphide solution below pH 9.0, but its solubility increases rapidly with increasing pH to over 10 g/L at pH 13. No solubility data are available for this system at temperatures above 100° C., but test results (FIG. 2) indicate that for the pH range 9.5 to 9.8, at 150° C., the solubility of mercury in a 20 g/L sulphide plus polysulphide solution is about 60 mg/L, increasing to about 150 mg/L Hg in 50 g/L sulphide solution. As at ambient temperature, mercury is insoluble in sulphide solution at the high temperatures below pH 9.0. At pH values above about 10.0, the rate of reaction between sodium hydroxide and molten sulphur increases significantly, which is undesirable since dissolution of sulphur reduces the yield of the purified sulphur product. It is undesirable therefore to operate the extraction at a terminal pH above about 10.0.

Although the description has proceeded with reference to the use of an aqueous solution having the pH thereof controlled by the addition of sodium hydroxide, it will be understood that an equivalent amount of ammonium hydroxide can be added for pH control.

It is believed that there is no published data on the distribution coefficient for dissolved mercury, between molten sulphur and aqueous sulphide solutions, at temperatures above 120° C. Test data indicate that the distribution coefficient in favour of the aqueous sulphide phase at 150° C. increases from less than 1 below pH 9.0 to about 10 for a 10 g/L sulphide plus polysulphide solution in the pH range 9.0 to 9.3, to about 30 for a 25 g/L sulphide plus polysulphide solution at 9.5, and to over 50 for 50 g/L sulphide plus polysulphide solution at pH 9.6 to 9.8, provided that the solubility of mercury in the aqueous phase is not exceeded. It appears that good mercury extraction can be achieved consistently if the terminal mass ratio, of dissolved sulphide plus polysulphide ions to dissolved mercury in the aqueous phase, is maintained above about 300:1.

The mercury may be recovered from the separated aqueous sulphide solution containing such metal contaminant by adjusting the pH of the aqueous sulphide solution to a sufficiently low value to cause precipitation of the mercury contaminant, and separating the precipitated mercury containment from the remaining aqueous sulphide solution. For this purpose, the pH of the aqueous sulphide solution is advantageously lowered to about 5 by addition of sulphuric acid.

BRIEF DESCRIPTION OF THE DRAWINGS

The process of the invention will now be described with reference to the following non-limitative examples taken in conjunction with the accompanying drawings, in which.

DESCRIPTION OF THE EXAMPLES

Example 1

Effect of Lixiviant to Mercury Ratio

Figure 1:
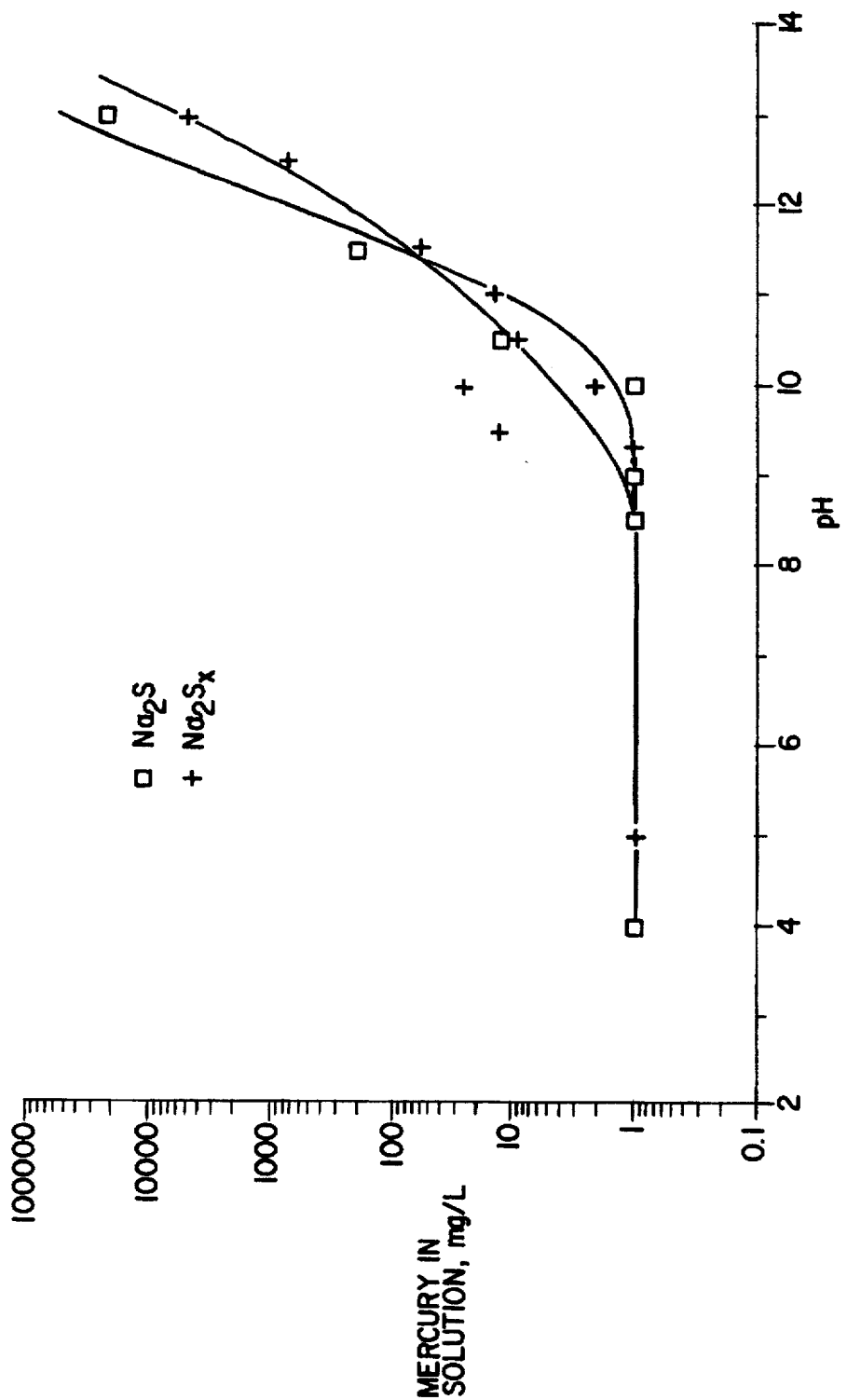
FIG. 1 is a graph illustrating the effect of pH value on solubility of mercuric sulphide in sodium sulphide and polysulphide containing solutions at 85° C.
Figure 2:
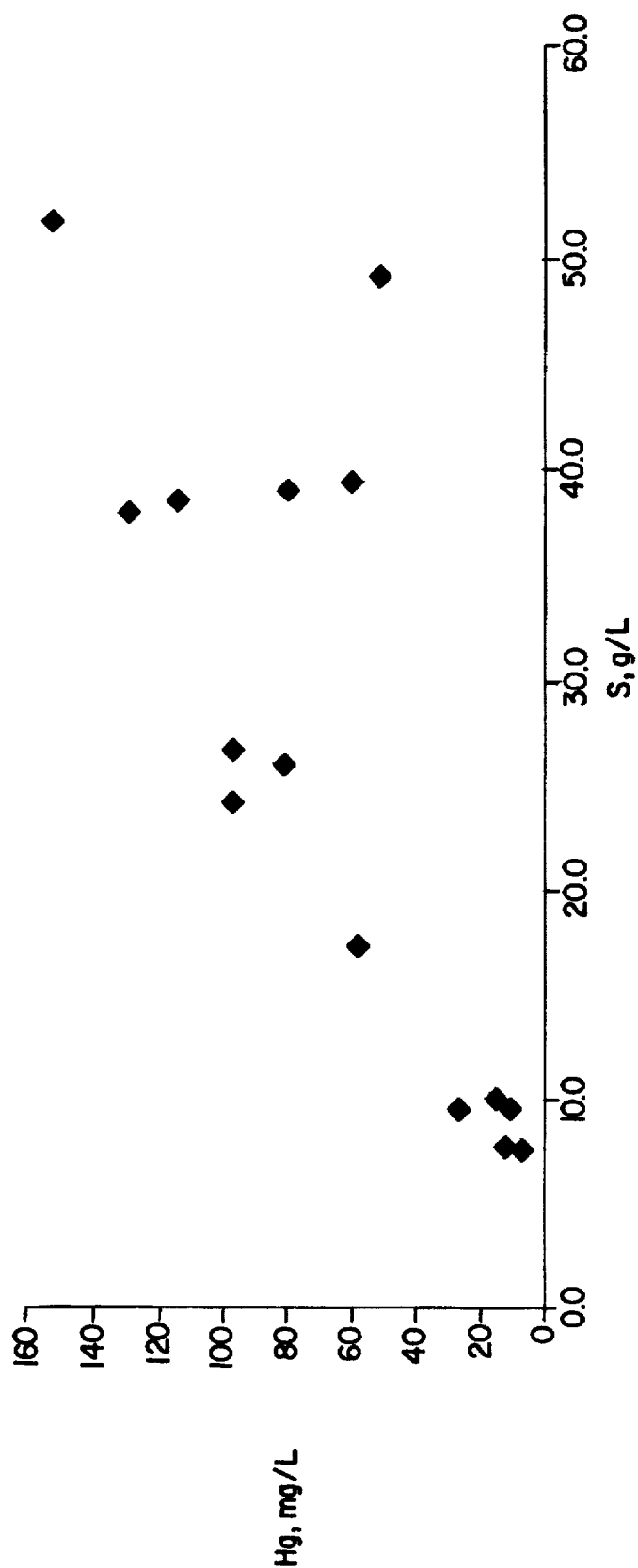
FIG. 2 is a graph illustrating the effect of sulphide and polysulphide sulphur concentrations on the solubility of mercury in the aqueous solutions used in the extraction tests after cooling to ambient temperatures.

Elemental sulphur containing about 30 g/t mercury and an aqueous sodium sulphide and/or sodium hydroxide solution with a pH of about 13 were charged into an autoclave. The volume ratio of elemental sulphur to aqueous solution was 1:1. The autoclave was heated to 140° C. and, after 15 minutes at this temperature it was considered that the sulphur was completely molten. Agitation by means of a single axial impeller in the autoclave was then carried out for 10 minutes, and the contents were then allowed to settle for 5 minutes. Molten sulphur was then discharged through a bottom value in the autoclave.

It is believed that sodium sulphide or sodium hydroxide react with elemental sulphur to provide suitable lixiviant for mercury in accordance with the following reactions.

$$Na_2S+(x-1)S \rightarrow Na_2S_x$$

$$6NaOH+(2x-2)S \rightarrow 2Na_2S_x+Na_2S_2O_3+3H_2O$$

$$Na_2S_x+HgS \rightarrow Na_2HgS_{x+1}$$

The quantities of sodium sulphide or sodium hydroxide were varied in four of the tests, as given in Table 1 below:

TABLE 1

| Test | Charge, g Sulphur | Charge, g Na$_2$S | Charge, g NaOH | Mole Ratio S$^2$:Hg* | Solution pH Head | Solution pH Product | Hg in Sulphur, g/t Head | Hg in Sulphur, g/t Product |
|---|---|---|---|---|---|---|---|---|
| 9  | 2000 | 1.6  | —    | 62:1   | 12.1 | 7.9 | 37 | 18 |
| 13 | 2000 | —    | 12.5 | 350:1  | 13.2 | 9.0 | 31 | 4  |
| 6  | 2000 | 8.1  | 5.0  | 540:1  | 12.9 | 9.5 | 28 | <2 |
| 11 | 2000 | 32.5 | —    | 1400:1 | 13.2 | 9.3 | 31 | <2 |

*Ratio of sulphide or sulphide equivalent, to mercury in the feed sulphur.

Mercury was extracted from the elemental sulphur phase into the aqueous phase in all of the tests. The quantity of mercury remaining in the sulphur phase was excessively high in the tests with a molar ratio of sulphide, or sulphide equivalent as sodium hydroxide, to mercury of less than 540:1, although a molar ratio of less than 540:1 and greater than 350:1 would likely be sufficient to leave a concentration of less than 3 g/t in the sulphur product. The pH of the aqueous solution is critical to the net extraction of mercury and a solution pH of 9 or greater is required to prevent precipitation of mercury as mercury sulphide and reincorporation of the mercury sulphide into the molten sulphur phase. In Test 9, with addition of 0.8 g sodium sulphide per kg of sulphur, the pH of the solution decreased to 7.9 and the sulphur product retained 18 g/t mercury, compared with <2 g/t mercury in Tests 6 and 11 with a terminal solution pH of 9.3 to 9.5.

Example 2

Effect of Sulphide Concentration in Aqueous Solution

Several samples of elemental sulphur produced by pressure leaching zinc sulphide concentrates in sulphuric acid solution, and containing 15 to 50 g/t of contaminant mercury, were contacted with aqueous sodium sulphide and/or sodium hydroxide solutions at elevated temperature in a series of tests to study the effect of variations in the composition and quantity of the lixiviant on the efficiency of mercury extraction. In a typical test, the volume ratio of aqueous solution to molten elemental sulphur was either 1:1 or 2:1, and the extraction was carried out in an agitated autoclave at 140° C. After 10 minutes of thorough mixing, the agitation was stopped to allow the sulphur and aqueous phases to separate under gravity, and the molten sulphur phase was then discharged through a bottom valve in the autoclave.

The aqueous sulphide and polysulphide containing solutions comprised from 4 to 25 g/L Na and from 10 to 50 g/L total sulphur, of which from 10 to 40 g/L was present as S$^{2-}$ (including S$^{2-}$, S$_x^{2-}$, HS$^-$, and HS$_x^-$), with the balance of the sulphur being present as thiosulphate (S$_2$O$_3^{2-}$). The molar ratio of S$^{2-}$:Na was typically in the range 1.5:1 to 1.9:1.

The results of these tests are shown in the following table in which the Mole Ratios represent the molar ratio of sulphide and polysulphide (or equivalent formed from sodium hydroxide) in the aqueous feed solutions, to mercury in the contaminated sulphur, and the Hg Distribution Ratios represent the mass ratio of mercury concentration in the product aqueous solution, to mercury concentration in the product molten sulphur.

In Table 2, the S$^{2-}$ concentrations include sulphur present as the sulphide or hydrosulphide ion and as polysulphide ions, but exclude sulphur present as thiosulphate ions.

TABLE 2

| Test | Aqueous Solution S$^2$, g/L* | Aqueous Solution pH | Aqueous Solution Hg, mg/L | Feed S$^{2-}$/Hg Mole Ratio | Sulphur Hg, g/t | Hg Dist'n Ratio |
|---|---|---|---|---|---|---|
| 3  | 8  | 9.2 | 12  | 330  | 4  | 3   |
| 5  | 8  | 9.0 | 8   | 172  | 8  | 1   |
| 8  | 9  | 8.6 | 10  | 470  | 13 | <1  |
| 4  | 10 | 9.3 | 27  | 660  | <2 | >15 |
| 15 | 10 | 9.0 | 16  | 1080 | <2 | >8  |
| 13 | 10 | 9.0 | 11  | 350  | 4  | 3   |
| 6  | 18 | 9.5 | 58  | 540  | <2 | >30 |
| 10 | 24 | 9.5 | 97  | 360  | 5  | 20  |
| 19 | 26 | 9.9 | 81  | 415  | <1 | >80 |
| 16 | 27 | 9.6 | 97  | 420  | 3  | 32  |
| 22 | 33 | 9.8 | 129 | 330  | 2  | 65  |
| 20 | 39 | 9.7 | 79  | 810  | <1 | >80 |
| 23 | 39 | 9.7 | 114 | 380  | 5  | 22  |
| 21 | 40 | 9.7 | 59  | 1080 | <2 | >30 |
| 11 | 49 | 9.3 | 50  | 1400 | <2 | >25 |
| 7  | 52 | 9.6 | 152 | 386  | 5  | 30  |

The effective extraction of mercury from sulphur containing 30 g/t Hg to less than 3 g/t requires a mercury distribution ratio of at least 10:1. The data in the table above indicate that a distribution ratio over 10:1 is only achieved consistently if the sulphide concentration is greater than 20 g/L. The two successful tests with only 10 g/L S$^{2-}$ (Tests 4 and 15) succeeded because of the high S$^{2-}$/Hg mole ratio.

In tests with sulphide plus polysulphide sulphur cocentrations of 20 g/L or more in the aqueous solution, the unsuccessful ones were those in which the S$^{2-}$/Hg molar ratio in the feed streams was less than 400:1, and/or the Hg concentration in the aqueous solution was too high.

Effective extraction of mercury thus preferably requires: a sulphide plus polysulphide sulphur concentration of over 20 g/L in the aqueous solution; a solution pH of at least 9.5; a Hg concentration of less than 100 mg/L in the aqueous solution; and a S$^2$/Hg molar ratios of at least 400:1 in the process feed streams.

Example 3

Effect of pH on S$^{2-}$/Hg Molar Ratio

The following table indicates the effect of varying pH from 9.0 to 9.9 on the mole ratio of sulphide and polysulphide in the aqueous feed solution to mercury in the feed sulphur on the mercury extraction.

TABLE 3

| Test | pH Range | Feed S²⁻/Hg Mole Ratio | Sulphur Hg, g/t |
|---|---|---|---|
| 5 | 9.0 | 112 | 8 |
| 13 | 9.0 | 350 | 4 |
| 15 | 9.0 | 1080 | <2 |
| 3 | 9.2 | 330 | 4 |
| 4 | 9.3 | 660 | <2 |
| 10 | 9.5 | 360 | 5 |
| 6 | 9.5 | 540 | <2 |
| 7 | 9.6 | 386 | 5 |
| 16 | 9.6 | 420 | 3 |
| 23 | 9.7 | 380 | 5 |
| 20 | 9.7 | 810 | <1 |
| 22 | 9.8 | 330 | 2 |
| 19 | 9.9 | 415 | <1 |

The requirement for a sulphide:mercury molar ratio of at least 400:1 in the feed streams appears to apply equally right through the pH range from 9.0 to 9.7. At pH values of 9.8 and above, satisfactory Hg extraction is attainable with ratios below 400:1 (e.g. 300:1 in Test 22)

Example 4

Effect of Temperature

Because the elemental sulphur must be molten to ensure effective mixing with the aqueous sulphide solution, the temperature has to be in the range of from about 120° C. to about 155° C. Below about 120° C. sulphur is a solid and, above 155° C., molten sulphur becomes very viscous. Test 19 was conducted at 125° C. and the results from this test are compared with the results for tests at 140° C. in the table below. The reagents were sodium hydroxide in Test 13, as described above, a mixture of sodium sulphide and sodium hydroxide in Test 16, and sodium sulphide alone in Test 19.

TABLE 4

| Test No. | NaOH* Addition (g/kg S) | Temperature (°C.) | Retention Time (min) | Solution pH Head | Solution pH Product | Hg in Sulphur (g/t) Head | Hg in Sulphur (g/t) Product |
|---|---|---|---|---|---|---|---|
| 13 | 6.25 | 140 | 10 | 13.2 | 9.0 | 31 | 4 |
| 16 | 6.81 | 140 | 10 | 12.9 | 9.5 | 28 | 3 |
| 19 | 6.25 | 125 | 10 | 13.0 | 9.9 | 26 | <1 |

*Cr equivalent as sodium sulphide

Increased net mercury extraction was obtained at 125° C. It would appear that although the reaction of mercuric sulphide with aqueous sulphide is rapid at this temperature, the reaction of elemental sulphur with caustic is less rapid than at 140° C. As caustic is less readily consumed at 125° C., the pH of the aqueous solution may be maintained at a higher level, and mercury is better stabilized in the aqueous solution.

Example 5

Precipitation of Mercury from Aqueous Solution

Leach solutions from the sulphur contact tests were treated with dilute sulphuric acid at 85° C. to yield final solutions with a pH of about 5. Representative tests are described in the table below.

TABLE 5

| Test No. | Temperature °C. | Retention Time (min) | H₂SO₄ Addition (g/L) | Hg in Solution (mg/L) Head | Hg in Solution (mg/L) Product |
|---|---|---|---|---|---|
| 16 | 85 | 30 | 11 | 97 | <1 |
| 21 | 85 | 10 | 29 | 59 | <0.2 |
| 15 | 85 | 2 | 6 | 29 | <0.2 |

It is believed that mercury and sulphur are precipitated from the leach solution according to the following reactions.

$$Na_2HgS_{x+1}+H_2SO_4 \rightarrow Na_2SO_4+HgS+(x-1)S+H_2S$$

$$Na_2S_x+H_2SO_4 \rightarrow Na_2SO_4+(x-1)S+H_2S$$

$$2Na(HS_x)+H_2SO_4 \rightarrow Na_2SO_4+(2x-2)S+2H_2S$$

A retention time of as little as 2 minutes is sufficient to produce a solution containing 0.2 milligrams/liter (mg/L) mercury or less.

Other examples of the invention will also be readily apparent to a person skilled in the art, the scope of the invention being defined in the appended claims.

What we claim as new and desire to protect by Letters Patent of the United States is:

1. A process for the liquid-liquid extraction of dissolved mercury from molten elemental sulphur contaminated by said dissolved mercury comprising contacting the molten elemental sulphur with an aqueous solution containing dissolved sulphide and polysulphide ions in an amount sufficient to provide a molar ratio of sulphide and polysulphide in the aqueous solution to mercury in the contaminated sulphur of at least about 400:1 in the agitated pressure vessel, at a temperature in the range of about 120° to about 155° C., for a period of 1 to 10 minutes, maintaining an aqueous solution pH in the range of about 9 to about 10 by periodically adding sodium hydroxide into the elemental sulphur, and separating the mixture into a heavier molten product sulphur phase containing less than three grams/ton of mercury and a lighter aqueous phase product solution enriched in dissolved mercury.

2. A process as claimed in claim 1, in which the mass ratio of sulphide plus polysulphide ions to mercury in the aqueous phase product solution is at least about 300:1.

3. A process as claimed in claim 1, adjusting a volume ratio of aqueous solution to molten sulphur in the contacting step to control the terminal concentration of dissolved mercury in the aqueous solution within the solubility limit of mercury in the aqueous solution.

4. A process as claimed in claim 3, in which the aqueous solution contains at least 20 g/L of dissolved sulphide plus polysulphide ions, maintaining the pH in the aqueous solution in the range 9.5 to 10.0.

5. A process as claimed in claim 4, in which the dissolved mercury in the aqueous phase product solution and the dissolved mercury in the molten product sulphur phase define a mercury distribution ratio, maintaining a mercury distribution ratio of at least 10:1.

6. A process as claimed in claim 3, in which the aqueous solution contains about 20 to about 50 g/L of dissolved sulphide plus polysulphide ions.

7. A process as claimed in claim 6, in which the volume ratio of aqueous solution to molten sulphur in the contacting step is in the range of about 2:1 to about 1:5.

8. A process as claimed in claim 6, in which the volume ratio of aqueous solution to molten sulphur in the contacting step is about 1:1.

* * * * *